June 22, 1965  S. C. BROOKS  3,190,454
DISPLAY STAND
Filed June 21, 1963  2 Sheets-Sheet 1
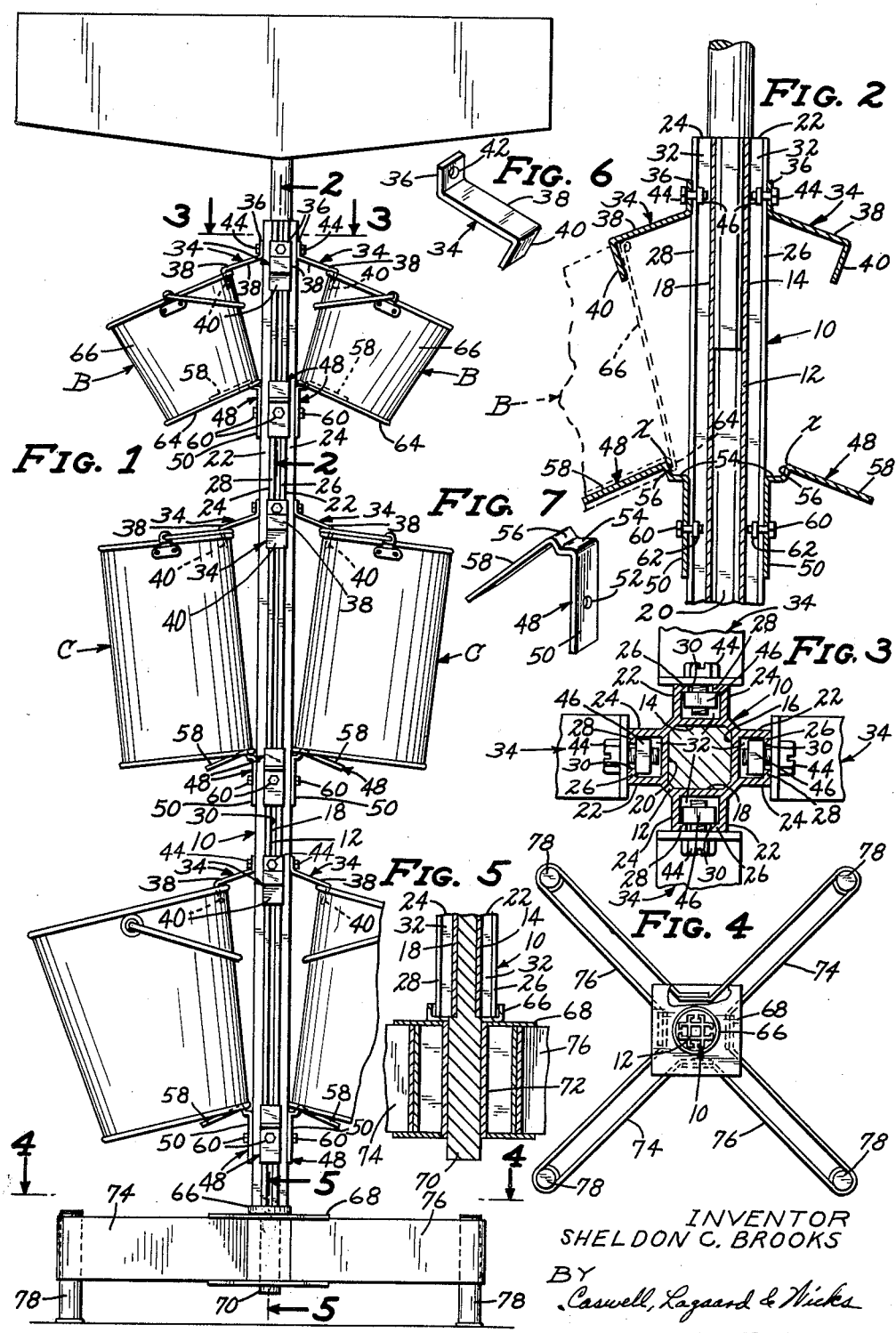
INVENTOR
SHELDON C. BROOKS
BY
Caswell, Lagaard & Hicks
ATTORNEYS June 22, 1965 S. C. BROOKS 3,190,454
DISPLAY STAND
Filed June 21, 1963 2 Sheets-Sheet 2
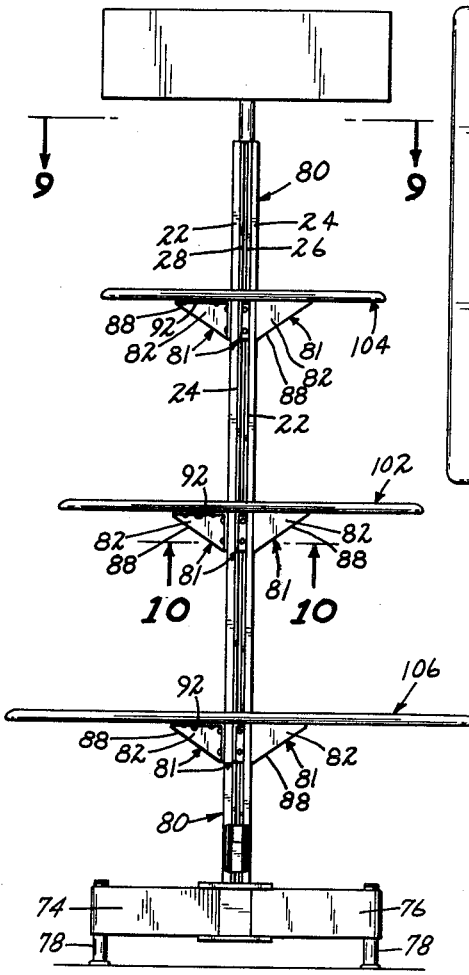
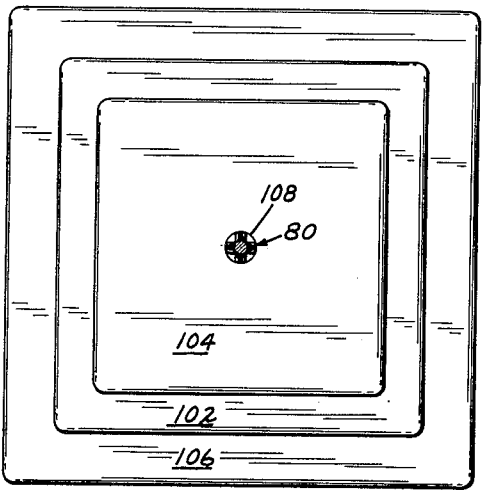
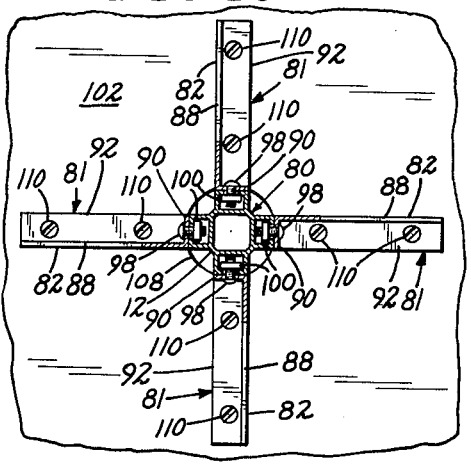
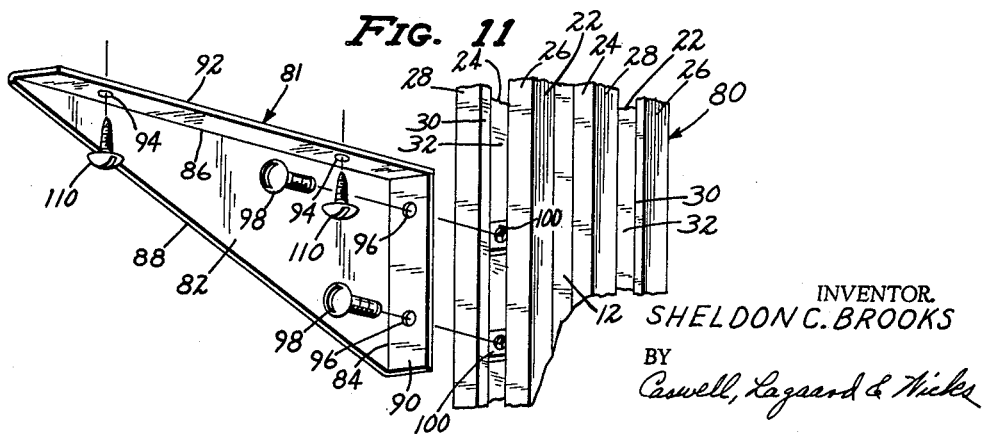
INVENTOR.
SHELDON C. BROOKS
BY
Caswell, Lagrand & Wicks
ATTORNEYS

United States Patent Office 3,190,454
Patented June 22, 1965

3,190,454
DISPLAY STAND
Sheldon C. Brooks, Minneapolis, Minn., assignor to Tri-State Displays, Inc., Minneapolis, Minn.
Filed June 21, 1963, Ser. No. 289,666
3 Claims. (Cl. 211—71)

The invention relates to an improvement in a display stand.

It is an object of the invention to provide a display stand having new and novel means for supporting a number of containers such as buckets in which wares may be displayed. It is a further object to provide a display stand having a central support member having a configuration which together with bracket members adjustably supports a multiplicity of containers, the bracket members of a construction allowing easy removal of the containers.

It is an additional object to provide a display stand having a central support mounting a bracket arm for adjustably securing a shelf member on the central support at any point thereon. The shelves may be easily and securely positioned to mount wares of different sizes for display.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is an elevational view of the display stand having a multiplicity of buckets mounted thereon.

FIGURE 2 is an enlarged sectional view on the line 2—2 of FIGURE 1.

FIGURE 3 is a sectional view on the line 3—3 of FIGURE 1.

FIGURE 4 is a sectional view on the line 4—4 of FIGURE 1.

FIGURE 5 is an enlarged sectional view on the line 5—5 of FIGURE 1.

FIGURE 6 is a perspective view of the upper bracket.

FIGURE 7 is a perspective view of the lower bracket.

FIGURE 8 is an elevational view of a display stand showing a further embodiment of the invention.

FIGURE 9 is a sectional view on the line 9—9 of FIGURE 8.

FIGURE 10 is a sectional view on the line 10—10 of FIGURE 8.

FIGURE 11 is an enlarged exploded perspective view of a bracket arm and a portion of the central support.

Referring to the drawings in detail, the display stand A includes the vertical standard 10. The standard 10 is formed of the hollow central portion 12 which includes the wall portions 14, 16, 18 and 20 joined at the vertical edges to form a polygonal cross section. Extending from the wall portion 14 are the spaced short walls 22 and 24 which terminate in the right angular short lip inturned spaced portions 26 and 28, respectively. The spaced lip portions 26 and 28 form a bolt-receiving slot 30 extending throughout the length of the standard 10 which leads to a nut-retaining channel 32 formed by the spaced short walls 22 and 24 together with the wall 14 and the lips 26 and 28. It will be seen that the width of the slot 30 is less than the width of the channel 32.

The standard walls 16, 18 and 20 each have a channel 32 and entrance slot 30 thereto formed by the short walls 22 and 24 and lips 26 and 28, respectively, identical to that found on wall 14.

Further provided is an upper container retaining bracket 34 which includes the flat base flange portion 36, and extending from the base 36 is the outwardly and downwardly extending arm 38. Formed at substantially a right angle to the arm portion 38 is the hook portion 40. The length and angle of the arm portion 38 is such that the hook 40 is spaced from the standard sufficiently to allow tilting and removal of the bucket as hereinafter described. The base 36 of the bracket 34 has formed therethrough the bolt-receiving hole 42. Any number of upper brackets 34 may be secured to the standard 10 with the base portion 36 upon the lips 26 and 28 by means of a bolt 44 extended through the hole 42 and the slot 30 with the nut 46 in any vertical position in the channel 32 drawn up on the inner surfaces of the lips 26 and 28 inasmuch as the channel 32 extends throughout the length of the standard 10.

The numeral 48 designates a lower container-retaining bracket including the base leg portion 50 having the bolt-receiving hole 52. The base leg portion 50 terminates at its upper end in the right angular lip portion 54 which in turn terminates in the substantially right angle upwardly extending shoulder portion 56 terminating in the outer leg portion 58 which extends outwardly and downwardly from the shoulder portion.

The length of the lip portion 54 is such that the shoulder 56 formed at the outer end thereof is close to the standard 10 whereby a tilted position of the container is effected with little loss of stability.

The lower retaining bracket is secured to the standard 10 by means of the bolt 60 extended through hole 52 and the slot 30 with the nut 62 drawn up on the bolt upon the inner surfaces of the lips 26 and 28.

The brackets 34 and 48 support a bucket such as B in the following manner: The brackets 34 and 48 are spaced apart upon the standard 10, a sufficient distance whereby the annular bottom lip 64 of the bucket B engages the shoulder portion 56 of the bracket 48 with the hook portion 40 of the upper bracket 34 extending downwardly into the bucket C and in contact with the inner surface of the wall 66 of the bucket. As will be seen, the length of the arm 38 determines the angle of the bucket. In this position the bottom of the bucket rests on the outer leg 58 of the lower bracket 48. To remove the bucket B, the same is tilted inwardly at the top towards the standard 10 pivoting on the upper end of the leg 58 where it joins shoulder 56 at point "x." As the bucket is so pivoted, the same may be lifted upwardly slightly so as to bypass the shoulder 56. Due to the downwardly extending position of the leg portion 58 of bracket 48 the bucket may then be moved outwardly of the standard, and when lowered as it is moved, the bucket is easily maneuvered to bypass the hook portion 40 of the upper bracket 34. To place the bucket in connection with the brackets 34 and 48, the upper edge of the wall of the bucket B is placed inwardly of the hook end 40 and upwardly into the area adjacent the inner end of the arm portion 38 and the standard 10 sufficiently so that the bottom lip 64 of the bucket bypasses the leg 58 and point "x." The bucket is then lowered so that the lip 64 of the bucket engages the shoulder 56 of bracket 48 with the hook 40 engaging the wall of the bucket particularly as illustrated in FIGURES 1 and 2.

The lower end of the standard 10 is formed with the cap 66 which rests upon the plate 68. Extending downwardly from the lower end of the standard 10 is the shaft portion 70 which rotatively fits in the bearing 72 secured at the juncture of the legs 74 and 76 supported on the uprights 78. As a result the standard 10 with buckets thereon may be rotated to view any or all of the buckets on the standard 10.

It will be seen that the buckets, such as B, may be adjustably placed at various positions on the standard 10 by positioning the brackets 34 and 48 relative to the standard and to another bucket. Also, due to the adjustability of the brackets 34 and 48 the same may be positioned to accommodate different size buckets, as illustrated in FIGURE 1, bucket C being larger than bucket B.

In FIGURES 8-11 is illustrated a further use of the standard 10 with regard to a further form of bracket and display shelf. The standard 80 of FIGURES 8-11 is identical to the standard 10 of FIGURES 1-7. Further provided is the bracket 81 which includes the upright flat portion 82 having a triangular formation with the base edge 84, the side edge 86 and the hypotenuse edge 88. Formed along the base edge 84 of upright portion 82 and at a right angle thereto is the vertical flange 90. Provided at the side edge 86 of the upright portion 82 and at a right angle thereto is the horizontal flange 92. The flange 92 has formed therethrough the spaced holes 94. The flange 90 is similarly formed with the spaced holes 96. All of the brackets 81 illustrated in FIGURES 8-11 are identical and each is secured to the standard 80 in the following manner:

A short bolt 98 is inserted through each of the holes 96 and extended through the slot 30 and the bracket secured upon the outer surfaces of the lip portions 26 and 28 by means of the nuts 100 positioned within the slot 32 and drawn up against the inner surfaces of the lip portions 26 and 28 thereby rigidly supporting the bracket 81 at any desired position upon the standard 80 with the flange 92 in a horizontal position.

The shelf 102, as well as the shelves 104 and 106 are each formed with a central opening 108 through which the standard 80 extends. The shelf 102, for example, is secured to four of the brackets 81 each secured to the central standard 80 by means of screws 110 positioned in the holes 94 of the flange 92 and secured into the shelf. It will be seen that with the standard 80 a multiplicity of shelves may be secured to the standard 80 and in any desired vertical position relative to the standard and to another shelf or shelves. This is, of course, due to the fact that the brackets 81 may be secured at any point along the length of the standard 80 by simply drawing up the bolts 98 upon the nuts 100 at any desired point, for the bolts may be moved into any position within the slot 30 which extends the entire length of the standard. Also, the channel 32 which receives the nuts 100 is coterminous with the slot 30.

The invention is not to be understood as restricted to the details set forth since these may be modified within the scope of the appended claims without departing from the spirit and scope of the invention.

Having thus described the invention, what is claimed as new and desired to be secured by Letters Patent is:

1. In a device for supporting containers,
   (a) a vertical standard having a hollow central portion which comprises four vertical, substantially flat central walls joined one to another by vertical edge portions thereof so that a cross section of said central portion defines substantially a polygon with proximate central walls being at substantially right angles to one another,
   (b) each of said central walls having a respective pair of spaced, outwardly extending, generally parallel vertical walls which together with its respective central wall defines a channel of generally rectangular configuration,
   (c) the walls of each pair of outwardly extending walls each having at the outer edge thereof a lip extending toward the lip of the other related outwardly extending wall,
   (d) each pair of lips being spaced from one another so as to define a bolt receiving slot leading into its related channel,
   (e) a plurality of brackets mounted to said standard, each of said brackets having a connecting portion which bears against the outer portion of a related pair of said outwardly extending walls,
   (f) each bracket having hole means aligned with its related slot, and
   (g) nut and bolt means provided for each bracket and extending through said hole means of its related bracket in a manner to extend into its related channel and engage the inside surface of its related two lips so as to press its related bracket against its related pair of outwardly extending walls and thus secure its related bracket to said standard.

2. In a device for supporting containers,
   (a) a vertical standard having a hollow central portion which comprises four vertical, substantially flat central walls joined one to another by vertical edge portions thereof so that a cross section of said central portion defines substantially a polygon with proximate central walls being at substantially right angles to one another,
   (b) each of said central walls having a respective pair of spaced, outwardly extending, generally parallel, vertical walls which together with its respective central wall defines a channel of generally rectangular configuration,
   (c) the walls of each pair of outwardly extending walls each having at the outer edge thereof a lip extending toward the lip of the other related outwardly extending wall,
   (d) each pair of lips being spaced from one another so as to define a bolt receiving slot leading into its related channel,
   (e) a plurality of brackets mounted to said standard,
   (f) each of said brackets having a substantially flat vertical flange which bears against the outer portion of a related pair of said outwardly extending walls,
   (g) each bracket also having a support portion connected to and extending outwardly from its related flange,
   (h) each bracket having at least one bolt receiving hole extending through its flange and aligned with its related slot, and
   (i) nut and bolt means provided for each bracket and extending through said hole of its related bracket in a manner to extend into its related channel and engage the inside surface of its related two lips so as to press the flange of its related bracket against its related pair of outwardly extending walls and thus secure its related bracket to said standard.

3. In a supporting device,
   (a) a vertical standard having a hollow central portion which comprises four vertical substantially flat central walls joined one to another by four vertical substantially flat web portions, each of which joins respective proximate edges of two adjacent central wall portions, said central walls and web portions thus having a cross sectional configuration which defines substantially an octagon, with proximate central walls being at substantially right angles to one another,
   (b) each of said central walls having a respective pair of spaced, outwardly extending, generally parallel, vertical walls which together with its respective central wall defines a channel of generally rectangular configuration,
   (c) the walls of each pair of outwardly extending walls each having at the outer edge thereof a lip extending toward the lip of the other related outwardly extending wall, (d) each pair of lips being spaced from one another so as to define a slot adapted to receive therein an edge portion of a panel so that said edge portion of the panel can extend into the related channel and abut against the related central wall and thus be held in proper location with respect to said standard.

References Cited by the Examiner

UNITED STATES PATENTS

| | | | |
|---|---|---|---|
| 1,041,264 | 10/12 | Frend | 248—245 |
| 1,212,386 | 1/17 | Norberg | 248—311 X |
| 1,788,096 | 1/31 | Friedemann | 108—96 |
| 2,142,868 | 1/39 | Di Vincenzo | 248—311 X |
| 2,157,400 | 5/39 | Cooper | 108—96 |
| 2,427,416 | 9/47 | Petersen | 248—311 |
| 2,448,456 | 8/48 | Niskanen et al. | 248—156 |
| 2,665,166 | 1/54 | Roark | 248—224 X |
| 2,702,641 | 2/55 | Arthur | 248—71 |
| 2,940,718 | 6/60 | Beal | 248—245 |
| 3,039,727 | 6/62 | Engel et al. | 248—245 |

FOREIGN PATENTS 733,181 7/55 Great Britain.

CLAUDE A. LE ROY, *Primary Examiner.*